C. H. MARSHALL.
CHERRY PITTING MACHINE.
APPLICATION FILED DEC. 13, 1920.

1,390,804.

Patented Sept. 13, 1921.
3 SHEETS—SHEET 1.

Witness
C. E. Wilcox

Inventor
CHARLES H. MARSHALL.
By C. O. Marshall
Attorney

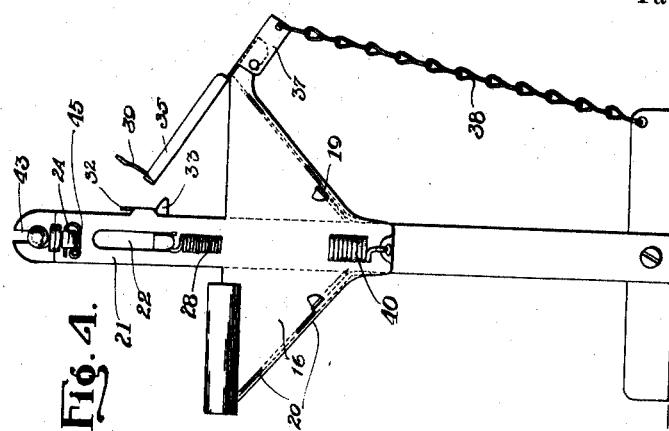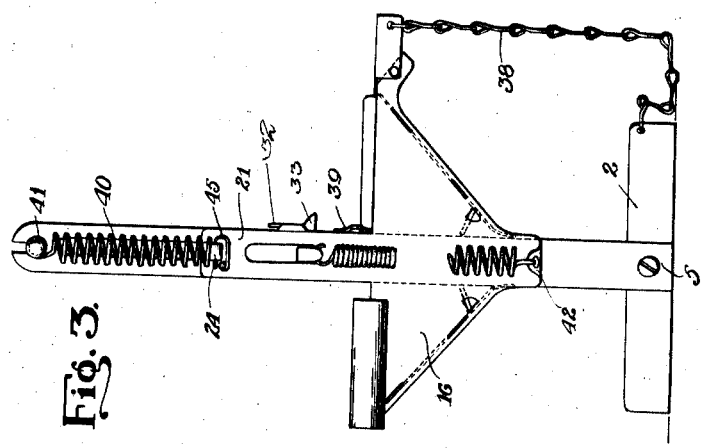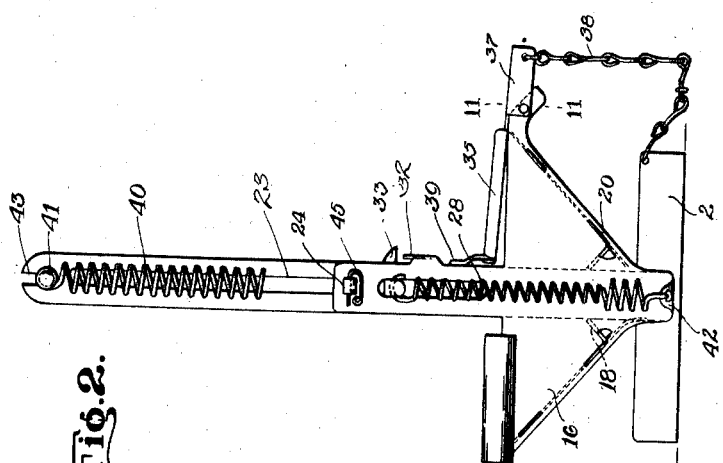

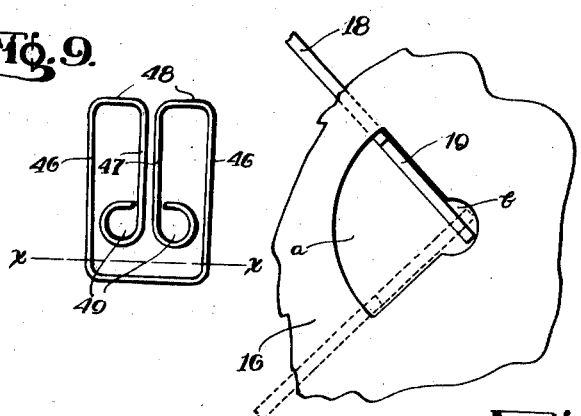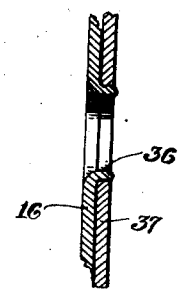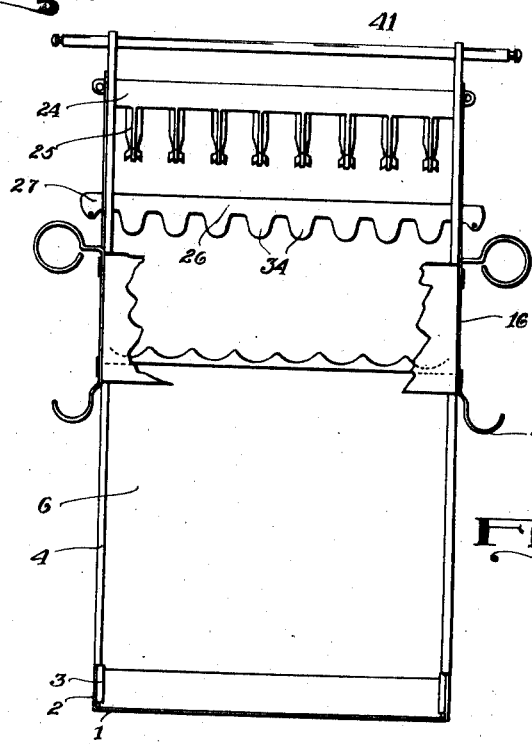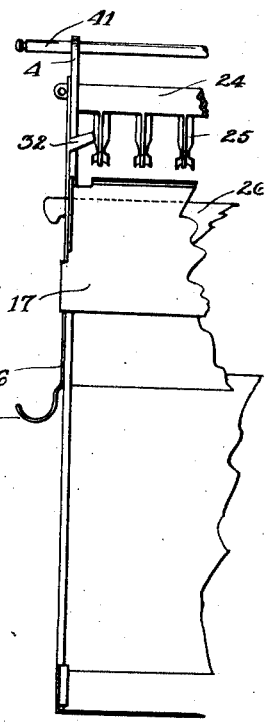

UNITED STATES PATENT OFFICE.

CHARLES H. MARSHALL, OF OMAHA, NEBRASKA, ASSIGNOR TO MARSHALL MANUFACTURING COMPANY, OF OMAHA, NEBRASKA, A CORPORATION OF NEBRASKA.

CHERRY-PITTING MACHINE.

1,390,804.  Specification of Letters Patent.  Patented Sept. 13, 1921.

Application filed December 13, 1920. Serial No. 430,197.

*To all whom it may concern:*

Be it known that I, CHARLES H. MARSHALL, a citizen of the United States, residing at Omaha, in the county of Douglas and State of Nebraska, have invented certain new and useful Improvements in Cherry-Pitting Machines, of which the following is a specification.

This invention relates to fruit pitting machines, and particularly to machines of the types shown in Letters Patent Nos. 1,167,005, issued to me January 4, 1916, and 1,331,274, issued to me February 17, 1920, in which the fruit is fed from a relatively movable hopper to a punching block.

One of the principal objects of the invention is to improve the feeding mechanism by providing efficient means to prevent the fruit in the hopper from being injured by the relative movement of the parts in contact therewith.

Another object is to increase the efficiency with which the fruit is positioned upon the punching block.

Another object is to increase the certainty of action of the apparatus for discharging the fruit from the punching block.

Another object is the provision of novel pivotal connections or hinges which are particularly adapted for use in the machine of my inventon but are also capable of use in other mechanisms.

Another object is the provision of a novel and inexpensive cotter or retaining pin.

Still another object is to simplify and improve the construction of the machine so as to enable the parts to be produced in finished condition largely by machine operations and easily assembled.

Other objects and advantages will be apparent from the following description, in which reference is had to the accompanying drawings illustrating a preferred embodiment of my invention and wherein similar reference numerals designate similar parts throughout the several views.

In the drawings:—

Figs. 2, 3 and 4 are end elevations showing the hopper respectively in its lowermost, intermediate, and uppermost positions, part of the springs being broken away;

Fig. 7 is a front elevation of the machine, part of the hopper being broken away, and the springs removed;

Fig. 8 is a fragmentary rear elevation showing one end of the machine, the springs being removed;

Fig. 9 is an elevation showing a clip from which retaining pins forming part of my assembled machine are cut;

Fig. 10 is an enlarged detail of one of the hinges employed; and

Fig. 11 is an enlarged fragmentary section taken substantially on the line 11—11 of Fig. 2 showing another hinge employed.

The base of the machine as illustrated consists of a sheet 1 of metal having its sides upturned to form flanges 2. Each of the flanges 2 is indented, as at 3, to receive the lower end of a standard 4, preferably made of heavy gage sheet or strap metal, and held in place by means of a rivet 5 or other fastening device, the standard being made to fit snugly in the indentation so that when the rivet is set the parts are held in substantially rigid relation.

Figure 5:
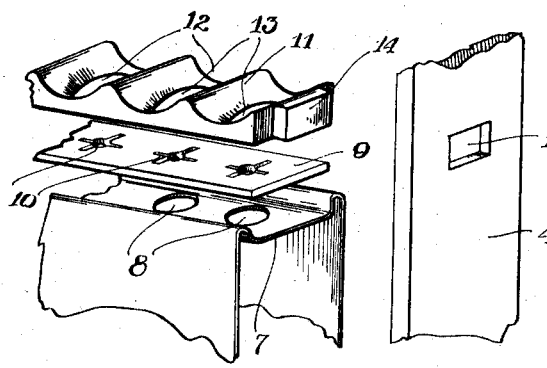
Fig. 5 is a perspective view showing portions of the punching block and frame in disassembled relation.
Figure 6:
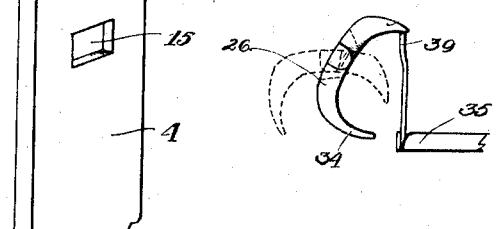
Fig. 6 is a fragmentary detail showing a part of the discharging apparatus.

The upper edges of the indented portions 3 of the flanges 2 are notched to receive the lower edges of a bottomless pit receiver 6, which is formed of a single sheet of metal, the upper side being channeled, as at 7 (see Fig. 5), and provided with openings 8.

Lying upon the pit receiver 6 within the channel 7 is a strip 9 of flexible material, such as rubber packing, which is provided with a series of substantially cruciform openings 10 registering with the openings 8 in the top of the pit receiver. Resting upon the flexible strip 9 is an elongated punching block 11 having a plurality of cherry-receiving depressions 12 in its upper surface, said depressions having bottom openings 13 in registration with the cruciform openings 10 in the flexible strip 9. The punching block 11 is provided at its ends with rectangular extensions or lugs 14 which, when the machine is assembled, fit within openings 15 in the standards 4.

In assembling the parts so far described, the standards 4 are first riveted in place, the pit receiver 6 is set with its lower edges in the proper notches, the flexible strip 9 is laid in the channel 7, the standards are sprung apart sufficiently to allow the punching block 11 to be placed upon the flexible strip and are then moved toward each other so that the lugs 14 are engaged in the openings 15, the parts being so proportioned that the strip 9 is snugly clamped between the pit receiver and punching block.

The hopper consists of end members 16 and sloping side members 17 secured thereto by any suitable means, such as lugs 20, projecting from the ends of the side members through openings in the end members and riveted in place. The lower edges of the side members 17 are spaced apart a sufficient distance to permit the standards 4 and pit receiver 6 to pass between them and the hopper and stationary frame are assembled by positioning the hopper downwardly over the standards after the pit receiver and punching block are in place.

Figure 1:
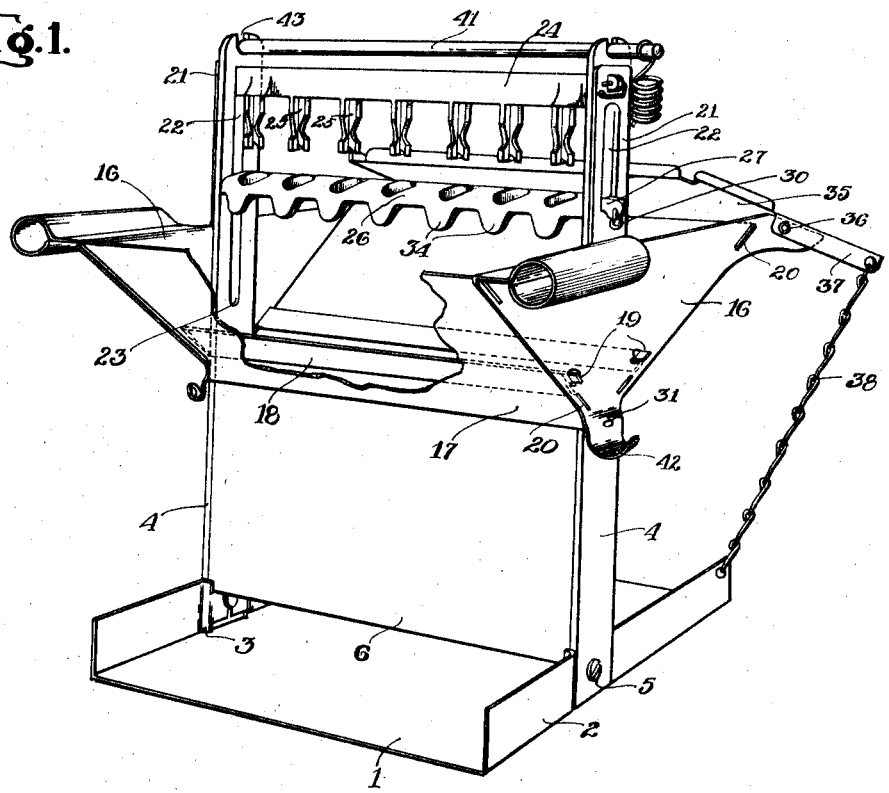
Figure 1 is a perspective view of a machine embodying my invention, parts being broken away and parts removed.

Lying within the hopper adjacent the lower edges of the side members 17 is a pair of pivoted guards 18. The ends of the guards 18 are provided with rectangular extensions 19 which project through openings in the end members 16. Each of these openings is shaped as shown in Fig. 10 and consists of two substantially sector-shaped portions $a$ and $b$, the arcs of the sectors having a common center. The guard 18 pivots about this center and its pivotal movement is limited by engagement of the sides of the extension 19 with the straight sides of the sectors. The cost of making the hinge so formed is negligible, while the hinge is very efficient and durable. As the hopper descends, the guard members engage the pit receiver and are moved to the positions shown in Figs. 2 and 3, and when the hopper is elevated, the guards fall to the positions shown in Figs. 1 and 4. The straight sides of the sector-shaped portions $a$ and $b$ of the openings through which the extensions 19 of the guards project prevent the guards from turning so far back as not to readily fall in position against the sides of the pit receiver.

Extending from the upper edges of the hopper are integral uprights 21 which are slidable along the standards 4 and are provided with slots 22 that register with longer slots 23 in the standards 4. The uprights 21 are also provided with openings that receive the ends of a plunger bar 24. Projecting downwardly from the plunger bar 24 is a row of pitting plungers 25 of cruciform cross-section, each in exact vertical alinement with the openings through the punching block, flexible strip, and pit receiver, so that when the hopper moves to its lowermost position the ends of the pitting plungers pass through these openings.

Lying above the punching block 11 is a tiltable stripping bar 26 provided with openings through which the plungers 25 pass as the plunger bar moves downwardly, the stripping bar being supported by trunnions 27 extending through the slots 23 and 22. Retractile springs 28, connected to depending ears 30 on the trunnions 27 and offset portions 31 of the hopper ends, yieldingly hold the trunnions in the lower ends of the slots 22 while the hopper is elevated. As the hopper is moved downwardly, the downward movement of the stripping bar is arrested when the trunnions engage the lower ends of the slots 23. The retractile springs are stretched by further downward movement of the hopper until the stripping bar is held in the lower ends of the slots 23 with considerable force.

Extending inwardly from the rear edges of the uprights 21 is a pair of fingers 32 which as the uprights move up and down engage lugs 33 projecting rearwardly from the stripping bar 26 and cause the bar to tilt as they pass the bar while it is held against bodily movement with its trunnions in the lower ends of the slots 23. The lugs are so shaped that while the stripping bar is only slightly tilted as the hopper and fingers descend, it is rocked through a considerable angle as they move upwardly. The springs 28, which at this time are stretched, serve to prevent the stripping bar from being lifted bodily by the fingers 32.

The stripping bar has a series of scoops 34 projecting downwardly from its forward edge. As the bar is rocked by the upward movement of the fingers, the scoops 34 sweep through the depressions 12 in the punching block 11.

A dumping plate or tray 35 is pivoted to the hopper ends by means of hinges such as are shown in Fig. 11. This hinge consists of a circular boss 36 which is formed of the metal of the hopper end by stamping and which engages a circular opening in a downturned flange 37 on the dumping plate. The dumping plate overlies the rear half of the hopper and projects rearwardly therefrom, the portion overlying the hopper being of sufficient weight to overbalance the projecting portion so that the plate rests upon the upper edges of the hopper ends. A chain or flexible member 38 connected to the projecting portion of the dumping plate flange 37 and the flange 2 of the base 1 and which is slack when the hopper is down becomes taut as the hopper approaches its uppermost position and thus causes the dumping plate to tilt on its hinges (see Fig. 4).

The edge of the dumping plate adjacent the punching block 11 carries an upstanding detent 39 which catches under the edge of the stripping bar 26 and prevents it from being immediately swung back to its normal position by the springs 28 when the fingers 32 release the lugs 33. At approximately the instant the lugs are released by the fingers 32, the trunnions are picked up by the lower ends of the slots 22 and the stripping bar hopper and dumping plate move upwardly together. When the chain 38 becomes taut, the detent presses upwardly upon the edge of the stripping bar and tilts it sufficiently against the tension of the springs 28 to slip from under it. The springs then swing the stripping bar to its normal position.

In order to assist in elevating the hopper, I have attached retractile springs 40 to the ends of a rod 41 that extends across the top of the machine and to upturned ears 42 upon the hopper ends 16. The rod 41 is provided adjacent its ends with reduced portions which fit in notches 43 in the upper ends of the standards 4. The rod thus serves to tie the standards together, as well as to support the springs.

In order to prevent the upper ends of the uprights 21 from springing outwardly, retaining pins 45 are passed through the projecting ends of the plunger bar 24. These pins consist of substantially straight arms 46 and 47 connected by a bight portion 48. One of the straight arms terminates in a ring 49 which closely approaches the other straight arm 46. When the pin is pushed into place, the ring rides over the outside of the end of the plunger bar and then springs toward the arm 46 which has passed through the hole. The ring when in this position prevents the pin from accidentally coming out of the hole, but the pin may nevertheless be easily withdrawn.

The process of making these pins consists in cutting off a portion of a paper clip of the form shown in Fig. 9 on the line x—x. This form of clip is obtainable on the market at a very low price, and since two retaining pins are formed from each clip without the employment of expensive special machinery, this process of making my retaining pin enables me to produce it very cheaply.

While it will be apparent that the illustrated embodiment of my invention herein disclosed is well calculated to adequately fulfill the objects primarily stated, it is to be understood that the invention is susceptible of variation, modification and change within the spirit and scope of the subjoined claims.

Having described my invention, I claim:

1. In a device of the class described, in combination, a pair of standards having openings therein, a channeled member positioned between said standards, a flexible strip lying within the channel of said member, and an elongated member overlying said flexible strip and having its ends extending into the openings in said standards.

2. In a device of the class described, in combination, a pair of standards having openings therein, a channeled member positioned between said standards, a flexible strip lying within the channel of said member, and an elongated member overlying said flexible strip and having its ends extending into the openings in said standards, said standards having notches in their upper ends and a rod having reduced portions fitting in said notches.

3. In a device of the class described, in combination, a relatively reciprocal hopper and wall, and a pivoted guard connected to said hopper and adapted to prevent the contents of said hopper from jamming against said wall.

4. In a device of the class described, in combination, a relatively reciprocal hopper and a receiver to be fed therefrom, a wall extending from said receiver along which said hopper reciprocates, and a pivoted guard connected to said hopper and adapted to prevent the contents thereof from jamming against said wall and to turn out of the way to permit the contents of said hopper to pass to said receiver.

5. In a cherry pitting machine, in combination, a punching block, walls extending downwardly therefrom, a reciprocating hopper having an opening in its bottom adapted to pass over said punching block and walls, and a pair of guard strips pivoted within said hopper adjacent the sides of said opening.

6. In a cherry pitting machine, in combination, a punching block, walls extending downwardly therefrom, a reciprocating hopper having an opening in its bottom adapted to pass over said punching block and walls, a pair of guard strips pivoted within said hopper adjacent the sides of said opening, and means to limit the pivotal movements of said strips.

7. In a device of the class described, in combination, a hopper having substantially vertical end walls and sloping bottom members spaced apart to form an opening in the bottom of said hopper, and a pair of guard strips having projections passing through holes in said end walls whereby said strips are pivoted adjacent said bottom opening.

8. In a device of the class described, in combination, a hopper having substantially vertical end walls and sloping bottom members spaced apart to form an opening in the bottom of said hopper, and a pair of guard strips having projections passing through holes in said end walls whereby said strips are pivoted adjacent said bottom opening, the openings in said end walls being of substantially double sector shape.

9. In a pivotal joint, a member having an opening shaped substantially like oppositely-extending concentric sectors, and a second member having a substantially flat projection extending into said opening.

10. In a device of the class described, in combination, a punching block, a sweeping device, means for moving said sweeping device toward and away from said punching block, means for swinging said sweeping device across said punching block, means for causing a return swinging movement of said sweeping device, and means for delaying said return movement until said sweeping device has moved away from said punching block.

11. In a device of the class described, in combination, a punching block, a reciprocating hopper, a sweeping device partaking of a portion of the movement of said hopper and connected thereto by spring means, and means operated by movement of said hopper in one direction for swinging said sweeping device across said punching block against the tension of said spring means.

12. In a device of the class described, in combination, a punching block, a reciprocating hopper, a sweeping device partaking of a portion of the movement of said hopper and connected thereto by spring means, means operated by movement of said hopper in one direction for swinging said sweeping device across said punching block against the tension of said spring means, and means for delaying the return swinging movement of said sweeping device throughout a substantial portion of the movement of said hopper.

13. In a device of the class described, in combination, a punching block, a vertically reciprocating hopper for supplying said punching block, a sweeping device for cleaning said punching block, a dumping member, means for moving said sweeping device into juxtaposition with said punching block during the first portion of the downward movement of said hopper, means for swinging parts of said sweeping device over said punching block during the first portion of the upward movement of said hopper, means for operating said dumping member during the last part of the upward movement of said hopper, and means connected to said dumping member to delay a return swing of said sweeping device until said dumping member is operated.

CHARLES H. MARSHALL.

Witnesses:
SYLVIA MARSHALL,
C. D. MARSHALL.